United States Patent [19]

Hallock et al.

[11] 4,178,738

[45] Dec. 18, 1979

[54] MODULAR GRILLE

[75] Inventors: Edward C. Hallock; Robert Olsen, both of Summit; George Ennesser, Cranford, all of N.J.

[73] Assignee: Construction Specialties, Inc., Cranford, N.J.

[21] Appl. No.: 895,644

[22] Filed: Apr. 12, 1978

[51] Int. Cl.$^2$ .............................................. E04C 2/42
[52] U.S. Cl. ...................................... 52/663; 52/594; 403/381
[58] Field of Search ................ 52/663, 581, 591, 594; 403/174, 178, 381, 331, 338, 374, 314

[56] References Cited

U.S. PATENT DOCUMENTS

| | | | |
|---|---|---|---|
| 3,086,629 | 4/1963 | Blitzer | 52/663 X |
| 3,125,196 | 3/1964 | Fenner | 52/663 X |
| 3,390,506 | 7/1968 | Walters | 52/663 |
| 3,726,055 | 4/1973 | Brant | 52/663 X |

*Primary Examiner*—Carl D. Friedman
*Attorney, Agent, or Firm*—Brumbaugh, Graves, Donohue & Raymond

[57] ABSTRACT

A grille for use as a sunscreen, decorative facing, vision barrier and the like is made up of a multiplicity of modular pieces, each of which is of uniform cross section along its length. Each piece has walls terminating in spaced-apart parallel edges that define a base plane of the piece, and each piece is paired with another piece by bringing the edges of the two pieces together to produce a closed cell. An edge flange extends outwardly from a portion of the walls adjacent each edge of the piece, and a pair of closely-spaced, parallel slot flanges extend outwardly from a portion of the walls and define an outwardly open slot that is centered on a medial plane perpendicular to the base plane and parallel to the edges of the piece. The slot is, moreover, spaced from the line of intersection between the base plane and the medial plane, which line may be considered the axis of the piece, a distance substantially equal to one-half the perpendicular distance between the edge flanges. The two pieces that form each cell are interconnected by reception of the edge flanges of that cell in the slots of adjacent cells, the flanges when placed together matching the slot in cross section and being urged apart into tight frictional engagement with the slot flanges by a nail-like element.

12 Claims, 11 Drawing Figures

MODULAR GRILLE

BACKGROUND OF THE INVENTION

Grilles of various types and various forms of construction are widely used as sunshades, decorative facings, such as on walls and ceilings, and as vision barriers, both interior and exterior. There are many types of construction used in such grilles which permit the components of the grilles to be fabricated and shipped to the site of use in parts with little labor being required at the site to assemble and erect the grille. It is, of course, desirable that the structure of the components of the grille be such that they can be nested for shipping, particularly when the components are shipped over long distances, thereby to conserve space and save in shipping costs. It is similarly desirable that such grilles be easy to assemble and erect, thus to keep on site costs low.

One form of grille that has been marketed heretofore is composed of one-piece circular elements, each of which has on the outside of the walls diametrically opposite outwardly extending male and female matching dovetail flanges that extend parallel to the axis of the circular walls of the element, the dovetail flanges being located 90° apart around the periphery of the element. That form of grille is assembled by sliding each element axially along adjacent elements to join the dovetails and then peening or otherwise upsetting material at the ends of the dovetails to anchor the dovetail connections against sliding lengthwise.

A significant disadvantage of the grille just described is that the parts cannot be nested for shipment, thus adding considerably to the installed cost of the grille when there is a considerable distance between the place of manufacture and the place of installation. Moreover, it is desirable that the male (tenon) and female (mortise) parts of the dovetail connections between the elements fit closely while still permitting the elements to be slided together to connect them, and to the extent that the tolerances of the dovetails are established to provide a good fit, the more difficult is the operation of sliding them into place upon assembly. On the other hand, the establishment of tolerances that make the dovetails easy to slide together makes the fit between the parts of the dovetail poorer and the connection between elements less durable.

SUMMARY OF THE INVENTION

There is provided, in accordance with the present invention, a grille that is in some ways similar to the grille just described but which is constructed in a way that permits the pieces to be nested more densely for shipping and which employs connections between the pieces that makes the grille easier to assemble and provides better connections between the elements than are obtainable in the aforementioned previously known grille. More particularly, a grille, according to the present invention, comprises a multiplicity of pieces, each of which is of uniform cross section along its length and all of which are of the same length. Each piece has walls that terminate in spaced-apart, parallel edges defining a base plane of the piece, which base plane includes a medial, longitudinal axis centered between the edges. Each piece has a pair of edge flanges, one of which extends outwardly from a portion of the walls adjacent each edge, and a pair of closely-spaced, parallel slot flanges which extend outwardly from portions of the walls and define an outwardly open slot. The slot is (a) centered on a medial plane of the piece that includes the axis and is perpendicular to the base plane and (b) is spaced from the axis of the piece a distance substantially equal to one-half the distance between the edge flanges. The pieces of the grille are placed together edge to edge in pairs to form cells, and the pieces forming the cells are interconnected and the cells are connected to each other by reception of the edge flanges of each cell (other than those located at the perimeter of the grille) in the slots of adjacent pieces of adjacent cells. A nail-like element, which may have a round cross section or which may be flat and wide, is driven endwise, preferably at both ends, between the edge flanges at each connection point to urge the edge flanges apart and into tight frictional engagement with the slot flanges that receive them.

Preferably, the slot of each piece has a cross section that provides for locking or capturing the edge flanges within the slot against movement of adjacent cells radially apart, a dovetail shape being preferred.

The pieces making up each cell of the grille are made by cutting them to the desired length from an extrusion, the preferred material of the extrusion being aluminum. A grille embodying the present invention may consist entirely of identical cells of one type or may have two or more cells of different geometries or different sizes, or both different sizes and geometries. In all cases, each cell will be made up of two pieces which may be of the same or different cross sections, but all pieces of the grille must have the edge flanges and slot flanges formed and located relative to the base plane and the axis of the piece in the manner described above.

All of the pieces of the grille may have ends formed by the cuts made through the extrusion that are perpendicular to the axis of the extrusion, in which case all elements of the walls of each cell will lie perpendicular to the end planes of each cell and of the grille. Alternatively, the pieces may be cut along planes that form oblique angles with the axis of the extrusion, thereby to produce a grille in which the elements of the walls of each cell will lie oblique to the planes of the ends of the cell. Cells of the latter type can be interconnected in different ways to produce a grille in which the end planes of all cells lie in a common plane or in which the end planes of the cells intersect at angles. Pieces cut along planes oblique to the axis of the extrusion can also be joined to each other in a way that provides a cell, the ends of which lie in two planes that meet at an angle at the intersection between the pieces, thus to produce a grille having faces defined by the edges of the pieces that are oblique to the plane of a peripheral frame around the grille, i.e., a multifaceted effect. Thus, the various ways of cutting and assembling the pieces of the grille lend great versatility to the design possibilities from an appearance point of view.

The configuration in cross section of the walls of the pieces may vary considerably as a matter of the aesthetic design of the grille, and the possibilities in terms of thicknesses and shapes of the walls are virtually limitless, provided that the walls of each piece are confined to a space bounded by (a) the base plane, (b) a plane parallel to the base plane and passing through the slot, and (c) parallel planes perpendicular to the base plane and intersecting the edge flanges. For example, each piece may have walls forming all or part of a letter of the alphabet (to form a cell designed as a monogram) or part or all of a corporate logo, thus providing a grille that is personalized for use in buildings occupied by a business or institution. All that is required as far as the structural principle of the grille is concerned is that each piece have edge flanges and slot flanges configured and located in the manner hereinabove described in order to have the grid system of interconnections between the pieces that is inherent in that structural principle. The versatility of the grille of the present invention is an important advantage. It is advantageous, also, to provide walls that permit the pieces to be nested fairly densely to offer the advantage of economy in shipping. It is, of course, certainly possible to have configurations of the walls that have little advantage as far as packing density is concerned, but a loss of advantage in packing density may often be more than offset by a gain in an aesthetic characteristic made possible by the versatility of the system. Finally, the ease of manufacture and assembly of the grille are advantages that are attainable with all embodiments employing or containing the principles of the invention.

The present invention is related to an invention entitled GRILLE and described in application Ser. No. 895,642 filed concurrently herewith in the name of Alexandra Porumbescu.

For a better understanding of the invention, reference may be made to the following description of some exemplary embodiments, which should be considered in conjunction with the accompanying drawings.

DESCRIPTION OF EXEMPLARY EMBODIMENTS

Figure 1:
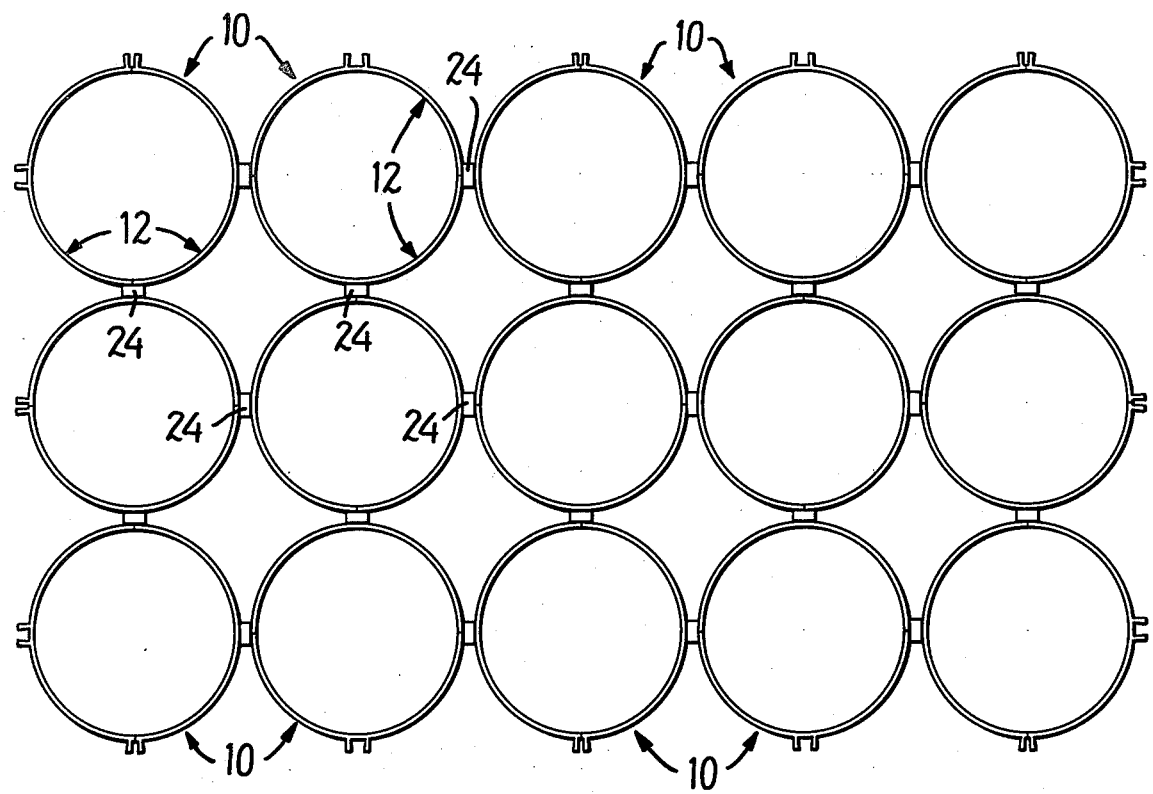
FIG. 1 is an elevational view of a representative section of a grille embodying the invention.
Figure 2:
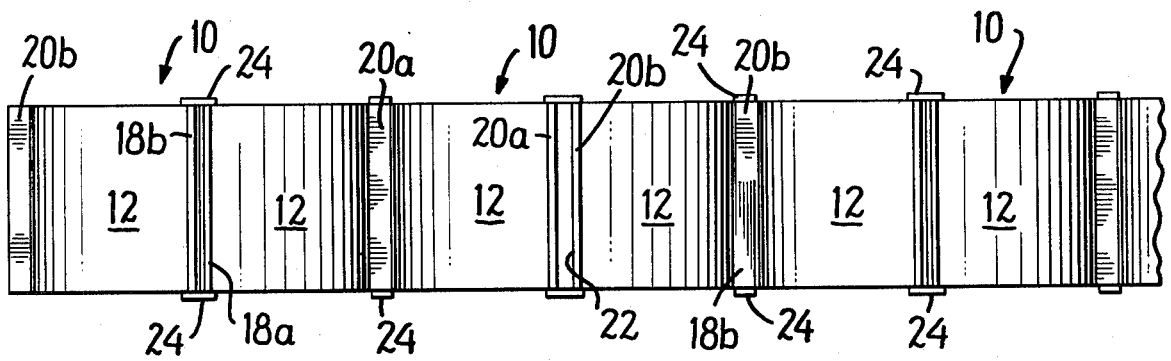
FIG. 2 is a top view of the grille of FIG. 1.
Figure 3:
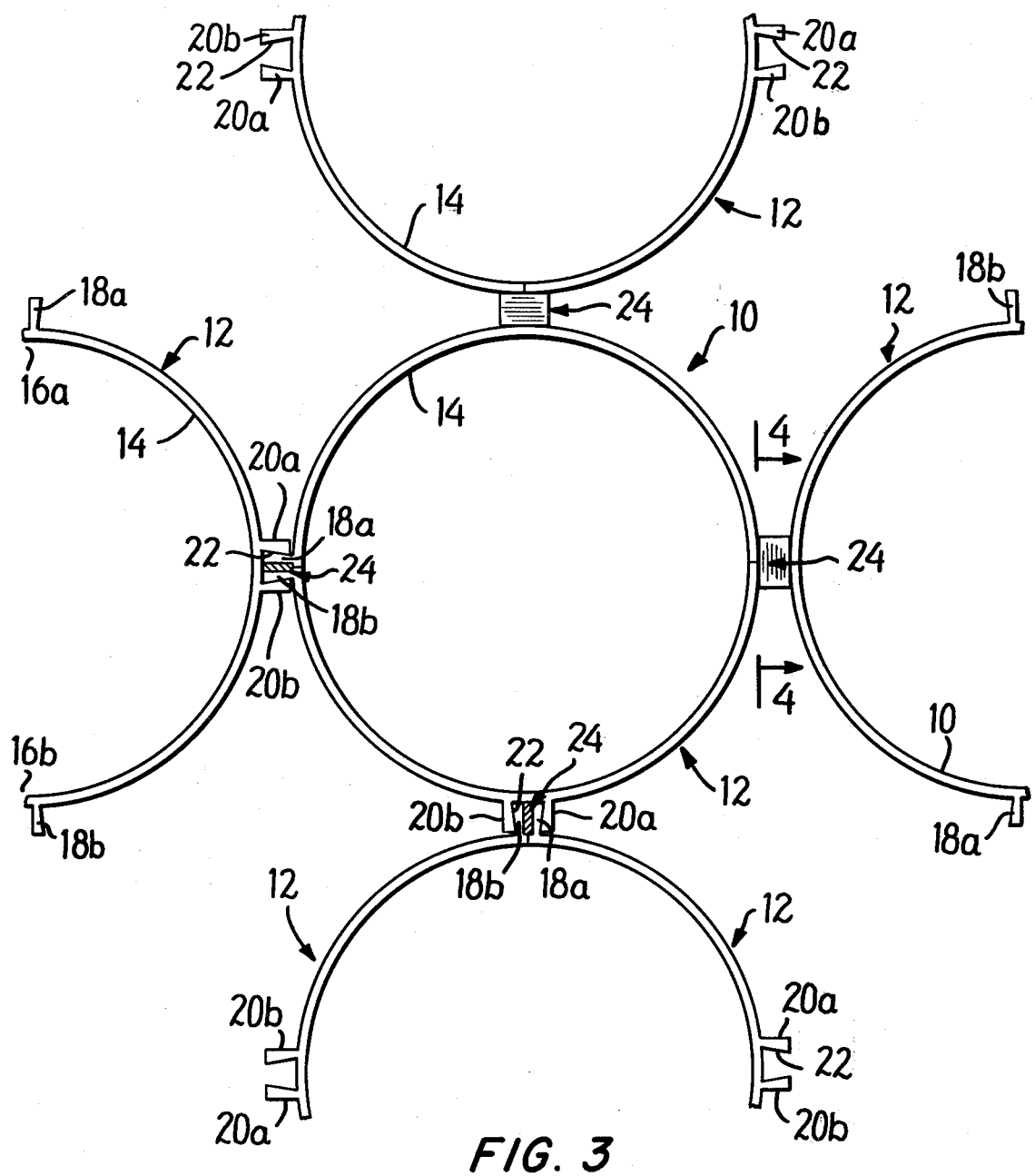
FIG. 3 is an elevational view of a section of the grille shown in FIG. 1, but on a larger scale and with portions broken away for clearer illustration.

The grille shown in FIG. 1 of the drawings is composed of identical cells 10, each of which consists of two identical pieces 12. As is more clearly shown in FIG. 3 of the drawings, each piece 12 comprises walls 14 that terminate at parallel edges 16a and 16b, an edge flange 18a, 18b that is located adjacent each edge of the walls 14 and extends outwardly from the walls, and a pair of outwardly extending slot flanges 20a and 20b that define an outwardly opening slot. Each piece 12 of the grille of FIGS. 1 to 4 is cut from an aluminum extrusion and is thus of uniform cross section along its length, i.e., perpendicular to the planes of the sheets as depicted in FIGS. 1 and 3 of the drawings. Thus, the edge flanges 18a and 18b, and slot flanges 20a and 20b extend parallel to each other along the lengths of the walls 14 between the ends thereof (see FIG. 2). The edges 16a and 16b of each piece 12 lie in a plane that is referred to herein as the base plane of the piece. A line parallel to the edges, centered between them and lying substantially in the base plane constitutes the axis of the piece. The slot 22 defined by the slot flanges 20a and 20b is centered on a medial plane of the piece that includes the axis of the piece and is perpendicular to the base plane. The base of the slot 22 is spaced a distance from the axis of the piece equal to one-half the distance between the inner ends of the edge flanges 18a and 18b.

Each cell 10 of the grille of FIGS. 1 to 4 is formed by placing the edges 16a and 16b of two pieces 12 together. The two pieces of each cell are joined to the adjacent pieces of adjacent cells by sliding the mating end flanges 18a and 18b of the two pieces endwise into the slots 22 of the adjacent pieces of adjacent cells. The walls of the slot flanges 20a and 20b defining the slots 22 converge outwardly, and the faces of the edge flanges 18a and 18b are oriented and shaped to be complementary to, and thus engage, the walls of the slot 22. A nail-like element 24 (see FIG. 4) is then driven into a narrow slot that is left between the adjacent faces of the edge flanges to urge the edge flanges within each slot 22 apart and into tight frictional engagement with the walls of the slot 22. The two pieces 12 of each cell are thereby joined securely to adjacent pieces of adjacent cells to produce a rigid grille.

Figure 4:
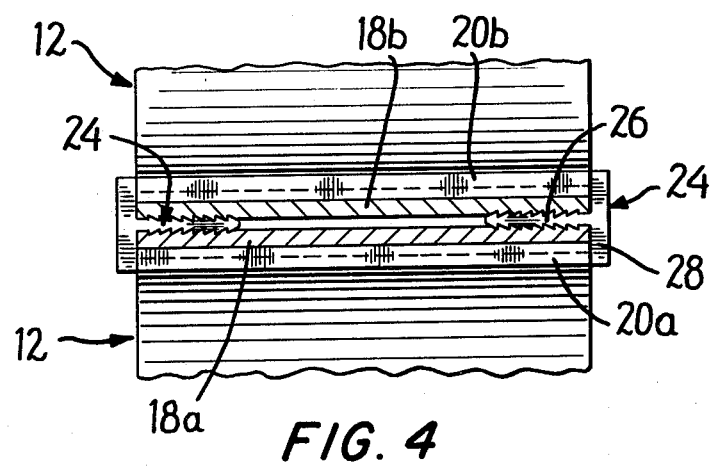
FIG. 4 is a fragmentary cross-sectional view of a typical connection between the pieces and the cells of a grille, the view being taken along the lines 4—4 of FIG. 3 and in the direction of the arrows.

As shown in FIG. 4, a suitable form of nail-type element has a wide, thin shank portion 26 having wedge-shaped serrations along each face and a head portion 28 that stops the nail by engaging the ends of the cells. Such nail-type elements can be made by cutting pieces of suitable lengths from an extrusion of suitable cross-sectional shape.

The grille shown in FIGS. 1 to 4 is made up of identical pieces 12 cut from extrusions made with the same dies, the pieces being cut along planes that lie perpendicular to the axis of the extrusion and the pieces being of equal lengths. Thus, all elements of the walls of each cell lie perpendicular to the planes of the ends of the cells, and all of the end planes of the cells lie in a common plane.

Figure 5:
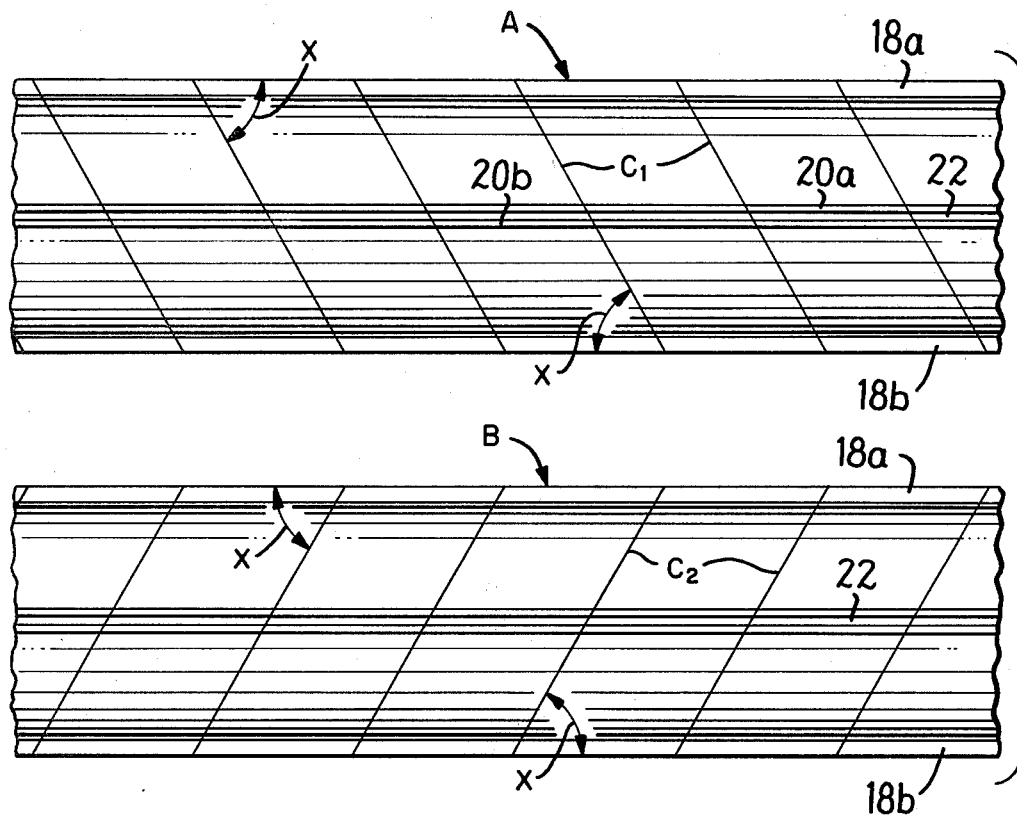
FIGS. 5 and 6 consist of top views of two lengths of extrusion and side views of two lengths of extrusion and are marked with cut lines illustrating ways of cutting pieces to make cells having walls that are oblique to the end planes.
Figure 6:
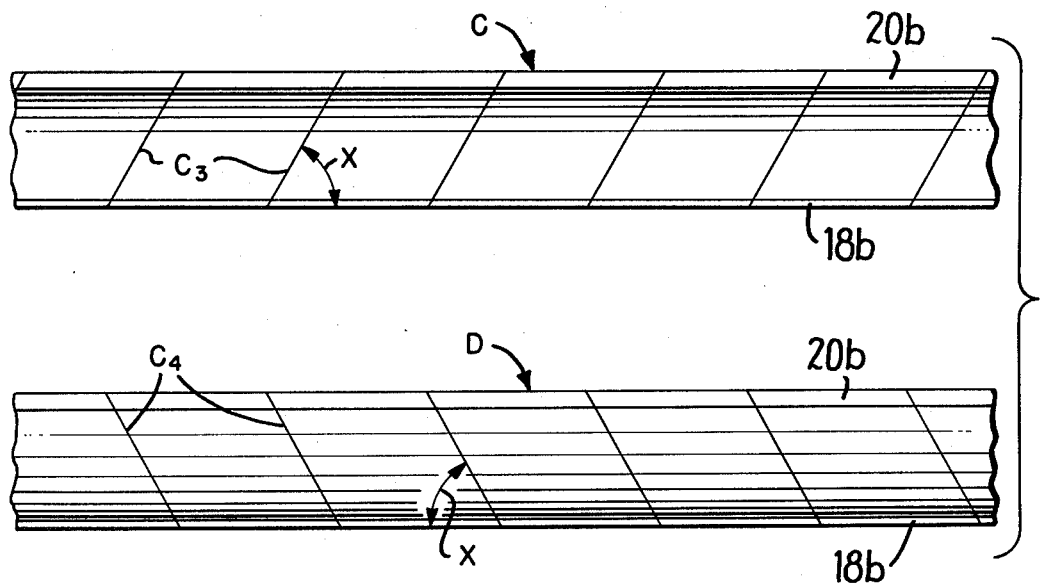

As shown in FIGS. 5 and 6, the same extrusion can be cut along planes that are oblique to the axis of the extrusion to form two sets of pieces, each set consisting of two pieces and each set forming a cell having ends lying in parallel planes and walls that lie oblique to the planes of the ends. More particularly, one set of pieces is formed in the manner depicted in FIG. 5 by cutting the extrusions along planes represented by the lines labelled "$c_1$" and "$c_2$" in FIG. 5. (FIG. 5 shows identical extrusions from the top.) The cut planes $c_1$ and $c_2$ are perpendicular to the base plane and oblique to the medial plane of the extrusion, the angle between the cut planes $c_1$ and $c_2$ and the medial plane of the extrusion (indicated by the arrowed line labelled "X") being selected to establish a desired angle of inclination of the walls of the cells to the end planes of the cells. The angles X are equal for both extrusions but are of opposite hands. The pieces A and B shown in FIG. 5, when placed edge to edge, as shown in FIG. 7, form one set of cells of the type labelled 10A in FIG. 7 in which the junctures between the cells lie in vertical planes.

Figure 8:
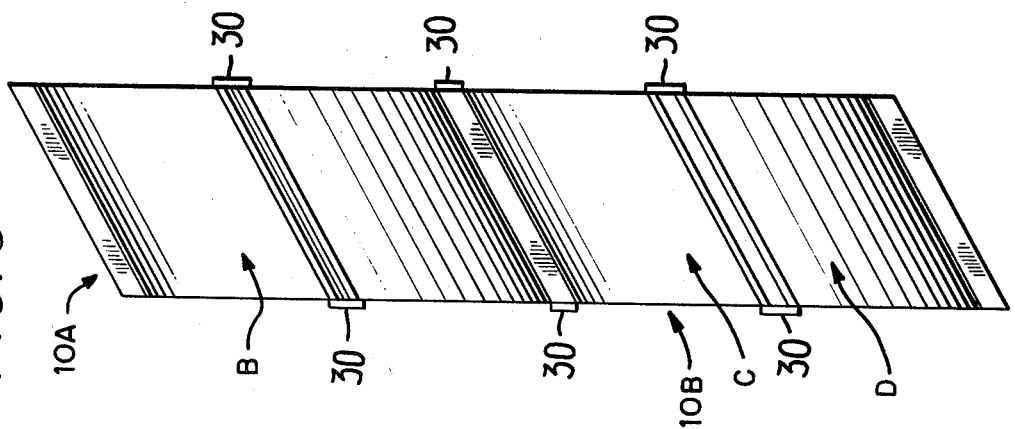
FIG. 8 is an end elevational view of the four typical cells of FIG. 7.
Figure 7:
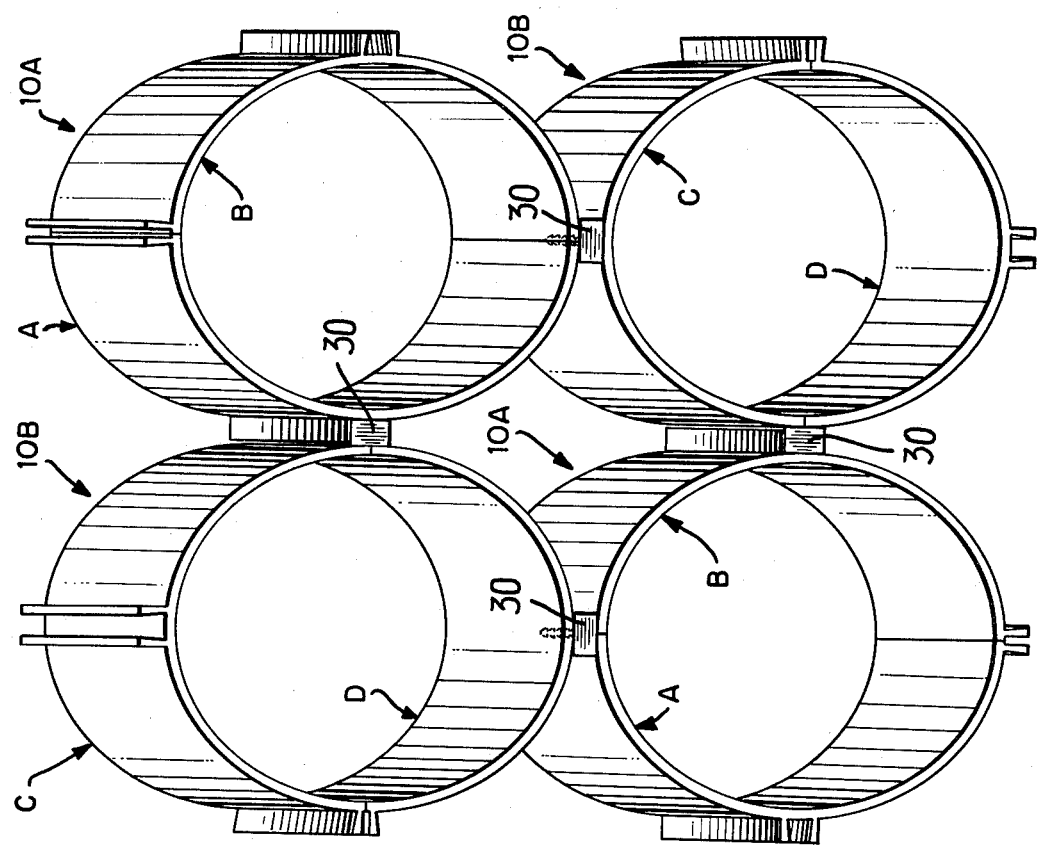
FIG. 7 is a front elevational view of four typical cells of a grille in which the walls of all cells lie oblique to a common plane that contains the ends of all cells, the grille of FIG. 7 being formed from pieces cut in the manner illustrated in FIGS. 5 and 6.

The other set of cells in the grille shown in FIG. 7 is made by joining pieces cut from the same extrusion along planes that lie at an angle X (the same angle X as the pieces in FIG. 5) to the base plane of the extrusion and perpendicular to the medial plane of the extrusion, thus to form pieces C and D that are the same except that the cut planes $c_3$ and $c_4$ are of opposite hands. Indeed, the pieces C and D are identical in all respects and are cut the same way from the extrusion. For purposes of indicating their orientation, which involves an end for end reversal, in the assembled grilles employing them, they are shown separately in FIG. 6 and given different letter designations. Mating the pieces C and D edge to edge produces a cell of the type designated 10B in FIG. 7 in which the junctures between the two pieces of the cells lie in planes that are oblique to the horizontal and perpendicular to the vertical, and assembly of the pieces A, B, C and D in the manner shown in FIGS. 7 and 8 produces a grille in which the ends of the cells lie in common end planes and all elements of the walls of the cells are oblique at the angle X to the common planes. Nail-like elements 30 similar to those used in the grille of FIG. 1, but having shanks oblique to the heads, force the edge flanges of adjacent pieces into tight frictional engagement with the walls of the slots of the pieces receiving them.

Figure 9:
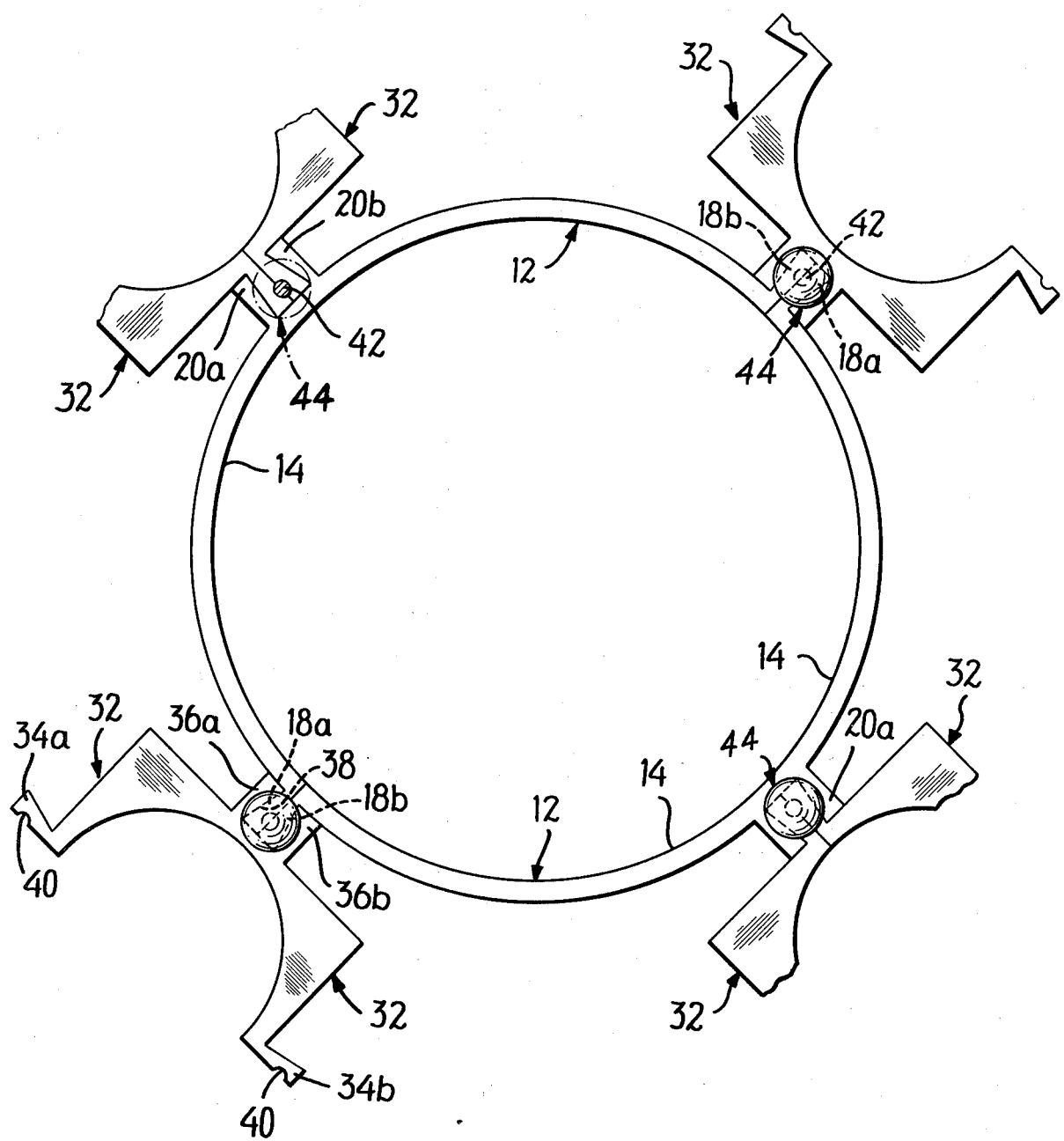
FIG. 9 is a front elevational view of a section of a grille of modified construction in that it is based on two sets of pieces.

FIG. 9 illustrates another grille embodying the invention and is exemplary of the numerous variations and modifications that can be made within the structural principle of the invention. The grille shown in FIG. 9 is composed of pieces 12 that are substantially identical to those of the grille shown in FIGS. 1 to 4 and pieces 32, all of which are identical to each other. Each piece 32 has walls having an internal semi-circular shape in cross section and an external rectilinear shape in cross section. Edge flanges 34a and 34b extend outwardly from the ends of the walls adjacent the base plane, and slot flanges 36a and 36b define a slot 38 that is centered on the medial axis of the piece. The shapes of the edge flanges and slot flanges are complementary and constitute components, i.e., split-tenons and mortise, of a dovetail connection. Each edge flange 34a, 34b has a small groove 40 of semi-circular shape in cross section in the face adjacent the base plane. The dimension measured in the base plane of the piece between the edges of the walls is substantially equal to one-half the corresponding dimension of the pieces 12.

The only difference between the pieces 12 of the grille shown in FIG. 9 and the pieces 12 of the grille shown in FIGS. 1 to 4 is the provision of small grooves 42 of semi-circular cross section formed in the faces of the edge flanges 18a and 18b adjacent the base plane of the piece. The edge flanges 34a and 34b and the slot flanges 36a and 36b of each piece 32 are identical in cross-sectional shape and dimension to the edge flanges 18a and 18b and the slot flanges 20a and 20b of the pieces 12, respectively, so that the edge flanges 34a and 34b of the pieces 32 will mate with the slot flanges 20a and 20b of the pieces 12 and vice versa.

The pieces 32 mate edge to edge to form cells that are of one-half the size of the cells formed by mating the pieces 12 edge to edge. As indicated by the cells partly shown at the 10:30 and 4:30 positions in FIG. 9, the pieces 32 mate edge to edge to form small cells that are joined to larger cells created by mating the pieces 12 edge to edge, the edge flanges of the pieces making up each cell being received in the slots of adjacent pieces of adjacent cells. Each larger cell made up of the pieces 12 is connected to four smaller cells, and each smaller cell is connected to four larger cells.

It is evident from the foregoing that grilles according to the present invention are constructed on a grid system defined by intersections at the junctures between pieces of the base planes and medial planes of the pieces. Thus, FIG. 9 illustrates combining larger cells and small cells within such a grid system. FIG. 9 of the drawings also shows that the grid system can be oriented oblique to the horizontal at any desired angle, an aspect which contributes to the versatility of the system.

FIG. 9 also shows a different form of nail-like element 44 urging the edge flanges of the pieces into secure frictional engagement with the slot flanges at the junctures between cells. The nail-like elements 44 consist of dome-like heads and round shanks and are indicative of the variations and modifications in the configurations of such nail-like elements used in a grille according to the present invention.

Figure 10:
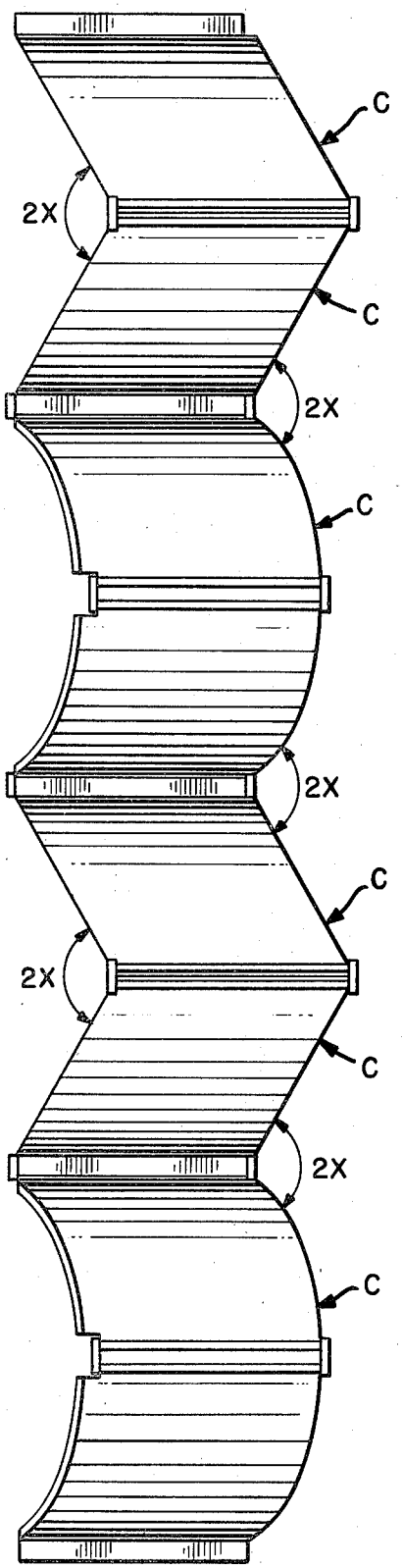
FIG. 10 is an end elevational view of a grille made from identical pieces cut from the same extrusion obliquely to the base plane and perpendicular to the medial plane.

FIG. 10 illustrates part of a grille assembled from identical pieces cut from the same extrusion along cut planes that are oblique to the base plane and perpendicular to the medial plane of the extrusion. In particular, the grille shown in FIG. 10 is assembled from the pieces "C" shown in FIG. 6, those pieces being cut in the manner described above and shown in FIG. 6 from extrusions that are the same as the extrusions shown in FIGS. 1 to 8. When the pieces "C" of FIG. 6 are placed edge to edge, the cells that they form have ends defined by plane that intersect at an angle 2X. Each cell of a grille assembled in the manner shown in FIG. 10 is identical to all others, but each cell is connected to four cells, the base planes of which are oriented at 90° to the base plane of that cell. In any given row of cells or column of cells in a grille, each cell is turned end to end relative to the adjacent cells, as may be seen in FIG. 10. In fact, FIG. 10 is not only an end elevational view, but is also a top elevational view. A front or rear elevational view of the grille of FIG. 10 will look almost exactly like the grille shown in FIG. 1 or FIG. 3, but it should also be quite apparent that the face of the grille of FIG. 10 will have a faceted effect.

Figure 11:
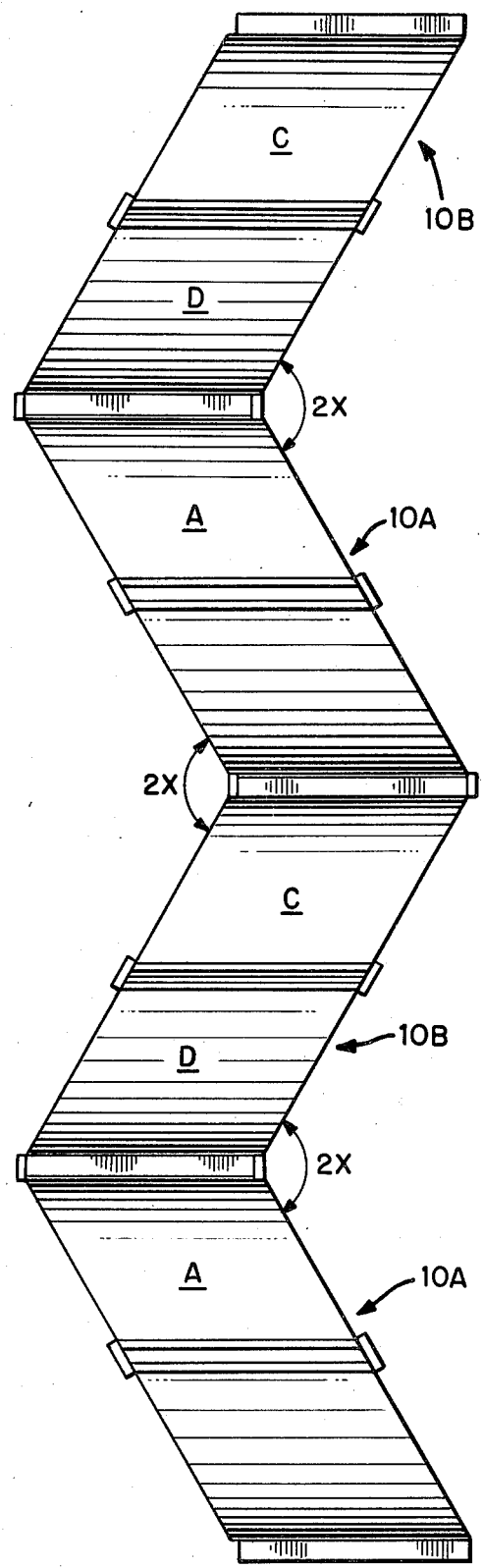
FIG. 11 is an end elevational view of a grille made from the cells of the grille shown in FIG. 7 but connected in a different way.

FIG. 11 of the drawings shows still another variation in the way in which cells of the types already described can be assembled. Instead of joining the type 10A and type 10B cells in the manner shown in FIGS. 7 and 8 with their walls oblique to the end planes, alternate horizontal rows of cells can be reversed end for end from the configuration of FIGS. 7 and 8 so that the planes of the ends of the cells of one row will intersect the planes of the ends of the adjacent rows at angles equal to twice the angle X. The resulting grille, which is shown in end elevation in FIG. 11, has cells arranged in horizontal rows, the end planes of the cells of each row forming common end planes of the row and the common end planes of adjacent rows of cells intersecting at angles equal to 2X. The walls of the cells are perpendicular to the overall plane of the grille as defined, for example, by the outermost front or back extremities of the pieces as assembled.

In the grilles shown in FIGS. 10 and 11 of the drawings, the junctures between pieces, the end planes of which intersect at angles, will not present flat surfaces but will come to points. The configuration at the ends of the junctures between the edge flanges and slot flanges of adjacent cells may either be concealed by providing nail-like elements having faces adjacent the shank that are complementary to the ends of the edge flanges and slot flanges or the ends of the edge flanges and slot flanges can be cut away so they will form a flat surface when the pieces are assembled. FIGS. 10 and 11 show the latter way of finishing the ends of the edge flanges and slot flanges.

We claim:

1. A piece for a grill comprising walls having spaced-apart parallel edges defining a base plane of the piece that includes a medial longitudinal axis parallel to and centered between the edges, a pair of edge flanges, one of which extends generally radially outwardly, relative to the longitudinal axis, from a portion of the walls adjacent each edge, and a pair of slot flanges extending generally radially outwardly, relative to the longitudinal axis, from portions of the walls and defining an outwardly open slot, the slot being (a) centered on a medial plane that is perpendicular to the base plane and includes the longitudinal axis of the piece and (b) spaced radially from the longitudinal axis of the piece a distance substantially equal to one-half the distance between the edge flanges, the piece being of uniform transverse cross section at all points along its longitudinal axis, and the walls of the piece being located within a space defined by (a) the base plane, (b) a plane parallel to the base plane and passing through the slot, and (c) a pair of parallel planes perpendicular to the base plane and passing through the respective edge flanges.

2. A piece for a grille according to claim 1, wherein the slot has a width at a location closer to the base plane that is greater than the width a location farther from the base plane and wherein the faces of the edge flanges that are nearer to the slot are complementary in shape to the faces of the slot flanges that face each other.

3. A piece for a grille according to claim 1, wherein each longitudinal end of the piece lies in a plane perpendicular to the base plane and to the medial plane of the piece.

4. A piece for a grille according to claim 1, wherein each longitudinal end of the piece lies in a plane that is perpendicular to the base plane and oblique to the medial plane of the piece, the respective end planes being parallel to each other.

5. A piece for a grille according to claim 1, wherein each longitudinal end of the piece lies in a plane that is oblique to the base plane and perpendicular to the medial plane of the piece, the respective end planes being parallel to each other.

6. A grille comprising a multiplicity of pieces of uniform transverse cross section along their lengths, each piece having walls terminating in spaced-apart parallel edges defining a base plane of the piece that includes a medial longitudinal axis centered between the edges, an edge flange extending generally radially outwardly, relative to the longitudinal axis, from portions of the walls adjacent each edge, and a pair of closely-spaced parallel slot flanges extending generally radially outwardly, relative to the axis, from portions of the walls and defining an outwardly open slot centered on a medial plane of the piece that is perpendicular to the base plane and includes the longitudinal axis of the piece, the slot being spaced radially from the longitudinal axis of the piece a distance substantially equal to one-half the distance between the edge flanges, said pieces of the grille being placed together in opposite edge-to-edge relation in pairs to form closed cells having two pairs of opposed edge flanges and the cells being interconnected by reception of each pair of opposed edge flanges of each cell, other than those flanges at the perimeter of the grille, in a slot of a piece of each of a pair of adjacent cells that are located opposite each other adjacent said pairs of edge flanges, and the grille further comprising means for holding each pair of opposed edge flanges of each cell in tight frictional engagement with the slot flanges receiving them.

7. A grille according to claim 6, wherein the means holding the flanges in engagement comprises at least one nail-like element received between each pair of opposed edge flanges of each cell and urging them apart and into such frictional engagement with the slot flanges of the slot receiving them.

8. A grille according to claim 6, wherein the slot of each piece has a width at a location closer to the base that is greater than the width at a location farther from the base and wherein the inter-engaging faces of the edge flanges and the slot flanges are of complementary shapes.

9. A grille according to claim 6, wherein each slot and the edge flanges received therein constitute a dovetail coupling, the edge flanges received in each slot constituting a split dovetail tenon of the coupling.

10. A grille according to claim 6, wherein each longitudinal end of each piece lies in a plane that is perpendicular to the base plane and to the medial plane thereof, the two end planes being parallel to each other.

11. A grille according to claim 6 wherein the opposite longitudinal ends of each piece define parallel planes that are oblique to the longitudinal axis, the grille being composed of four sets of pieces, as follows: first and second sets consisting of pieces, the longitudinal ends of which define planes that are, in turn, defined by a first line that lies in the base plane and is perpendicular to the longitudinal axis of the piece and a second line that lies in the medial plane of the piece and is perpendicular to the said first line and is oblique to the longitudinal axis of the piece, the pieces of the first and second sets being the same except that they are of opposite hands in respect of the orientation of the longitudinal end planes relative to the base plane and are thus adapted to be placed together to form cells having (1) planar longitudinal ends and (2) walls oblique to the planes of said ends; and third and fourth sets consisting of pieces, the longitudinal ends of which define planes that are, in turn, defined by a first line that lies in the base plane and is oblique to the longitudinal axis of the piece and a second line that lies in the medial plane of the piece and is perpendicular to the longitudinal axis of the piece, the pieces of the third and fourth sets being the same except that they are of opposite hands in respect of the orientation of the longitudinal end planes relative to the medial plane and are thus adapted to be placed together to form a cell having planar longitudinal ends and walls oblique to the planes of said ends.

12. A grille according to claim 6, wherein each longitudinal end of each piece lies in a plane that is oblique to the base plane and perpendicular to the medial plane, the two end planes of each piece being parallel to each other, and wherein all pieces of the grille are substantially identical.

* * * * *